United States Patent [19]

Boeckmann

[11] Patent Number: 4,529,843
[45] Date of Patent: Jul. 16, 1985

[54] SUBSCRIBERS TELEPHONE HOLD CIRCUIT WITH AUTOMATIC DISCONNECT

[75] Inventor: Eduard F. B. Boeckmann, Huntsville, Ala.

[73] Assignee: Gte Business Communication Systems Inc., Northlake, Ill.

[21] Appl. No.: 526,250

[22] Filed: Aug. 25, 1983

[51] Int. Cl.³ .............................................. H04M 1/00
[52] U.S. Cl. ................... 179/81 R; 179/99 H
[58] Field of Search ................ 179/81 R, 81 A, 99 H

[56] References Cited

U.S. PATENT DOCUMENTS 3,870,831  3/1975  McCarley ..................... 179/81 RX
4,440,981  4/1984  Grantland et al. ............... 179/99 H Primary Examiner—Gene Z. Rubinson
Assistant Examiner—James L. Dwyer
Attorney, Agent, or Firm—Robert J. Black; Gregory G. Hendricks

[57] ABSTRACT

A hold circuit for use with a single line telephone which may or may not be equipped with extension instruments. The circuitry in response to the momentary operation of a manual switch actuates a siliconcontrolled rectifier to place a resistive load across the telephone line thus allowing the subscriber at the basic telephone instrument to go "on hook". Subsequent removal of the basic instrument handset from the hookswitch or an extension phone going "OFF HOOK" will cause the resistive load to be removed. Also included is a hold release circuit which automatically disconnects the hold circuit after a predetermined period of time.

6 Claims, 1 Drawing Figure

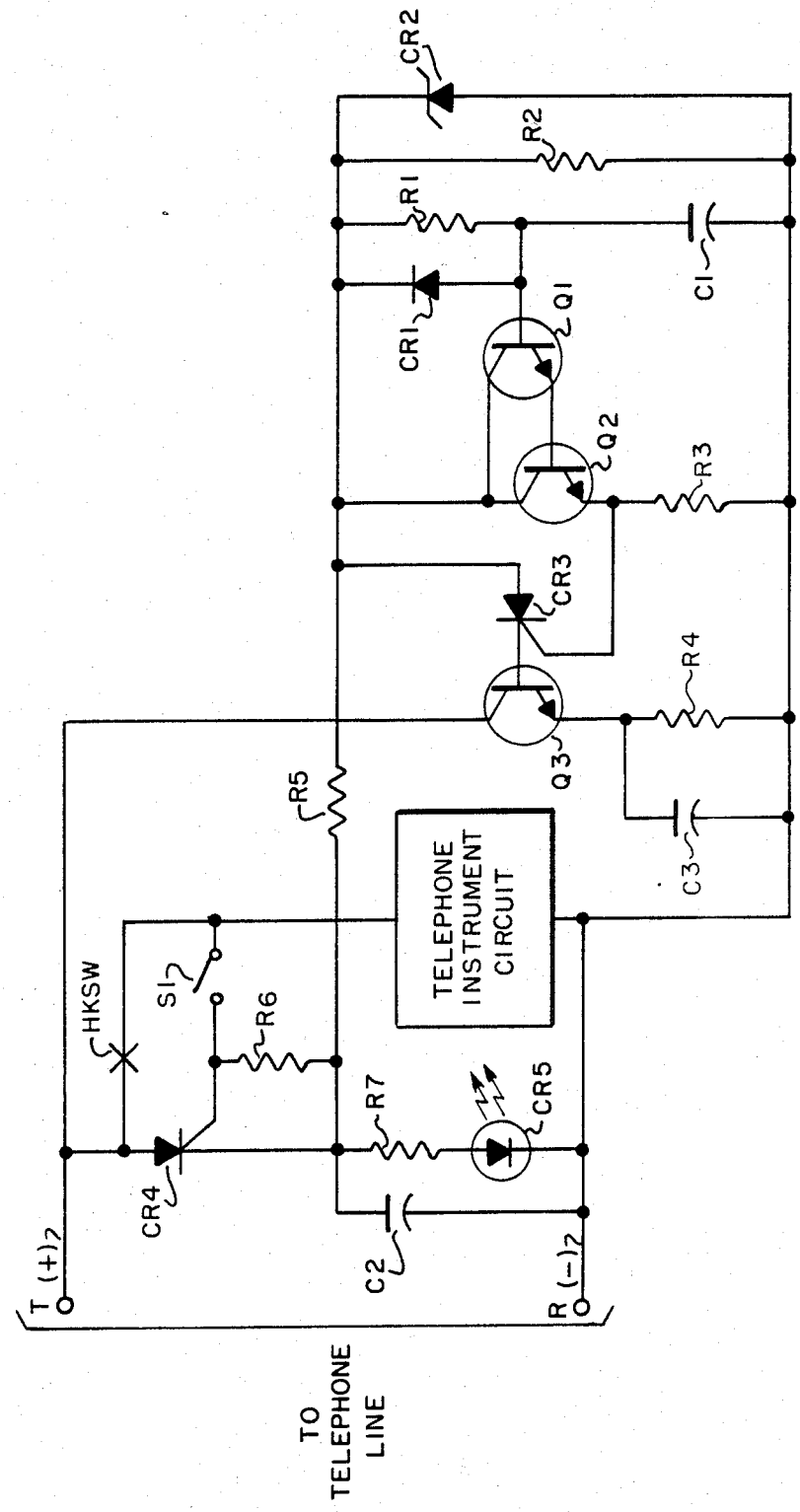

SUBSCRIBERS TELEPHONE HOLD CIRCUIT WITH AUTOMATIC DISCONNECT

CROSS REFERENCE TO RELATED APPLICATION

This application is related to U.S. application Ser. No. 526,231 filed on Aug. 25, 1983.

BACKGROUND OF THE INVENTION

(1) Field of the Invention

The present invention relates to subscriber telephone electronic hold circuits and more particularly telephone electronic hold circuits which require an automatic time disconnect of the hold condition after a suitable delay period.

(2) Background Art

Since the development of telephone circuitry employing active components, i.e.: solid state devices etc., additional features have become easy to add to the telephone. One such feature has been the "hold" circuit. With the provision of such circuit the telephone call may be electronically latched onto an artificial load allowing the handset to be returned to hookswitch, until the call is picked up on extension phone or at the original phone, at which time the hold condition is dropped automatically.

Previous hold circuits frequently make use of expensive components such as latching relays and/or integrated circuits voltage comparators and related associated circuitry adding substantial cost to the telephone. Sometimes these circuits have poor sensitivity because of the compromise between trigger "ON" sensitivity and the ability to drop completely on high resistance extensions and in the presence of low central office battery voltage. Some hold circuit methods require the use of a micro-processor and related circuitry to sense the line voltage change with conversion to a digital signal. It is obvious that all such circuitry suffers to some degree from overcomplexity with a reduction in the attendant reliability stemming from the increased number of components required in such circuit design.

Many of the existing hold circuits also suffer from the lack of inclusion of an automatic delay or time-out facility. In the event for example that a call is placed on "hold" and an extension or the original phone is not again taken off hook within a predetermined time period, it is desirable that the hold condition should be dropped, to avoid an excessive charge against the telephone subscriber. Therefore, it is desirable to add automatic time delay or time-out circuitry where the possibility exists that the hold condition will not be terminated within a predetermined period of time; say for example, six minutes, in order that the hold circuitry may be dropped automatically. There have been several means of providing such time delay functions. These have included for example, the use of integrated circuit voltage comparators sensing the charge on a capacitor and a microprocessor controlling the switching. While such circuits work they require relatively expensive support hardware and possibly the inclusion of additional software. Accordingly, it is the object of the present invention to provide a new and useful telephone hold circuit that includes an automatic disconnect feature.

SUMMARY OF THE INVENTION

The hold circuit portion of the present invention employs very simple circuitry consisting of a manually operated momentary switch, a silicon controlled rectifier, two resistors, a capacitor and light emitting diode. In the arrangement disclosed, the silicon controlled rectifier acts as the principal switching device to place a holding circuit across the telephone line in response to the momentary operation of the switch. It also provides current to the light emitting diode to indicate that the hold circuit is in operation. The included capacitor provides a voltage reference for the hold circuit and also provides the necessary back electromotive-force to turn off the silicon control rectifier with a drop in the telephone line voltage that occurs when an extension goes off hook or the hookswitch of the associated telephone is operated. By proper choice of the resistors and capacitor included in the present circuit, hold circuit operation can be guaranteed over a wide range of telephone line conditions.

The automatic timing delay and hold disconnect portion of the present invention consists of a timing capacitor, a timing resistor, a discharge diode and resistor, a voltage regulating zener diode and a high input impedance Darlington transistor in a common collector (emitter-follower) arrangement. A sensitive gate silicon controlled rectifier, a load switching transistor and an anti-latch-up resistor and capacitor are also employed. The basic function of the automatic disconnect circuitry is to switch an artificial load onto the subscriber telephone line causing the hold condition to drop out or be terminated. Switching occurs after a delay following the activation of the "hold" condition. When the "hold" condition is dropped, the timing circuitry becomes unpowered, and the transistor switch will go back to its "OPEN" state returning the telephone line to the normal condition.

This invention can also be used for general timing applications (other than telephone use or other applications in telephone equipment), where an extremely reliable circuit is required but timing accuracy is not of the utmost importance. For example, in the present circuitry an acceptable time period for the termination may be anything from 3 to 6 minutes. It is only important that a certain minimum and maximum time can be quaranteed. Timing is normally not adjustable by the subscriber, although modification of the present invention could be made to provide such a feature. The present circuitry has been found to be extremely reliable due to its basic nature of operation. Such reliability of operation is most important because of the wide ranges of temperature, humidity and telephone line conditions that may exist at any given telephone location.

In operation the timing circuit for the present invention can be thought of as a switch which is initially open, but closes momentarily after a certain time delay and then returns to open. When the "switch" is closed, a load, or voltage or element is connected to the external circuit to perform whatever function is desired. In the case of the telephone hold application, the switch places a resistive load across the Tip and Ring of the subscriber's line which simulates an off hook condition, thereby causing the hold to drop. The general operation of the circuit is first to start charging the timing capacitor when the hold condition begins. The level of charge is detected by a high impedance buffer stage (the Darlington transistor). When sufficient charge has built up, the circuit will be triggered on through a silicon controlled rectifier placing the load on the line. When the load is placed on the line the hold circuit senses the voltage drop and trips out, restoring the line to the normal condition.

BRIEF DESCRIPTION OF THE DRAWING

The single sheet of the accompanying drawing is a simplified schematic diagram of a subscriber's telephone hold circuit with automatic time out. The associated telephone instrument circuitry has been shown only in block form.

DESCRIPTION OF THE PREFERRED EMBODIMENT

Referring now to the accompanying drawing, the hold circuit portion of the present invention consists of a silicon controlled rectifier/(SCR) CR4, light emitting diode CR5, switch S1, resistors R6 and R7, and capacitor C2. The hold circuitry is typically connected across the Tip and Ring (T and R) of the telephone line. In a practical embodiment of the present invention surge protection circuitry would also be included across the telephone however, it has not been shown for purposes of simplicity inasmuch as it does pertain to the present invention. Also connected across the telephone line may be one or more extension telephones. The base telephone instrument is shown as the block labeled telephone instrument circuit, hookswitch HKSW, placed between SCR CR4 and momentary operative switch S1. It should be noted that the location of hookswitch is not important unless it is desired not to be able to initiate hold with the instrument on hook.

The silicon controlled rectifier CR4 is turned on when its gate is connected to the positive (T) lead through switch S1. Note it is important that the polarity of the T and R lines be as shown in the accompanying drawing. This is usually provided by means of the inclusion of a diode bridge in the circuit, however, it has not been shown in the present circuitry for purposes of simplicity. Resistor R6 provides cathode to gate feedback for controlling the triggering of the silicon controlled rectifier CR4. Resistor R7 limits current through the light emitting diode CR5, and the proper value permits sufficient hold current under both short and long telephone loop conditions. The value is maintained to several hundred ohms so that the circuit will drop properly when a related extension telephone goes off hook. This drop action is aided significantly by capacitor C2 which charges quickly to the line voltage less the voltage drop across silicon controlled rectifier CR4 when the hold feature is activated. When an extension is picked up or hookswitch HKSW is closed, from its open condition, capacitor C2 is now at a higher voltage than line T, relative to line R and therefore silicon controlled rectifier CR4 will be turned off due to negative potential anode-to-cathode, thus causing the hold to be dropped.

Closing of the momentary switch S1 would turn the silicon control rectifier CR4 back on for the next hold condition. The light emitting diode CR5 is a low voltage high current unit, with visible output over a wide range of telephone loop condition. It has been found that in a practical embodiment of the present invention, the circuit was shown to function with zero loop conditions at high battery voltage and with low battery voltage with up to 23.5 kilofeet of simulated telephone line.

Referring again to the accompanying drawing, the hold time-out circuit of the present invention will also be discussed. A Schottky diode CR1 is used as a low leakage rapid discharge device for a timing capacitor C1. Zener diode CR2 is used to regulate voltage for improved timing accuracy while silicon rectifier CR3 is used to trigger the artificial load R4 through switch device Q3. Resistor R1 is used for timing to establish the R-C time constant of the circuit. Resistor R2 provides a discharge path for capacitor C1 when the circuit has timed out. Resistor R3 is the emitter resistor for the Darlington transistor Q1-Q2 and allows a maximum value definition for the input impedance of the Darlington pair (Q1-Q2) in the circuit. Resistor R4 with capacitor C3 provide an anti-latch-up feature associated with the hold dropout function. Capacitor C3 allows a high initial current flow to drop the holding circuit and resistor R4 turns transistor Q3 off when capacitor C3 becomes charged. Resistor R5 applies a limited amount of current to the timeout circuit to avoid excessive current drain from the hold circuit.

In operation, after switch S1 is operated and the hold function is activated as described above, resistors R5 and R1 cause capacitor C1 to charge at an exponential rate. Diode CR2 maintains a constant voltage across the timing components resistor R1 and capacitor C1, regardless of telephone loop length so that the time out period is insensitive to telephone loop length. Transistors Q1 and Q2, silicon control rectifier CR3 and transistor Q3 are in the "OFF" condition, or not conducting current during the initial period during which C1 is charging. After a period of time, the charge on capacitor C1 will become sufficiently large that the voltage (about 1.2 volts) on the base of transistor Q1 is sufficient to bring transistors Q1 and Q2 into the active region where this Darlington pair then begin to conduct thru resistor R3, developing a voltage on the gate lead of silicon controlled rectifier CR3. It should be noted, however, that silicon controlled rectifier CR3 does not trigger "ON" until a sufficient voltage appears across register R3 (approximately 0.6 volt).

The Darlington pair consisting of transistors Q1 and Q2 provides a high impedance voltage sensing device to the charging circuit (resistor R1 and capacitor C1) to prevent disturbance of the charge time characteristic. As soon as silicon controlled rectifier CR3 triggers "ON" the base of transistor Q3 will be brought to a positive bias, rapidly switching transistor Q3 to the "ON" condition. The hold circuitry will now sense the load consisting of the saturation resistance of Q3, as a resistive load across the Tip and Ring of the line, and therefore will go out of the hold condition in a manner similar to that as occurs when an ordinary extension telephone goes "OFF" hook. As capacitor C3 charges, resistor R4 turns transistor Q3 off, to restore the circuit to the original condition and prevents the early timeout on retriggering of the hold condition.

It will be obvious to those skilled in the art that numerous modifications may be made without departing from the spirit of the present invention which shall be limited only by the scope of the claims appended hereto.

What is claimed is:

1. In combination, a telephone, a source of battery located at a central switching point, and a telephone line connecting said telephone to said battery source, said telephone including: a hold circuit comprising a load circuit, and switching means manually operated to cause said load circuit to be connected to said line to maintain said telephone in a hold condition; said load circuit consisting of a resistor, an indicator means connecting said resistor to said telephone line, and a silicon controlled rectifier serially connected between said telephone line and said resistor, operated in response to said switching means to connect said resistor to said telephone line; and hold release means connected to said hold circuit, operated a predetermined period of time after connection of said load and said telephone line, to render said hold circuit inoperative.

2. The combination as claimed in claim 1 wherein: said telephone further includes a hookswitch connected between said telephone line and said switching means manually operated to condition said switching means for operation.

3. The combination as claimed in claim 1 wherein: said hold circuit further includes voltage reference means connected in parallel with said load resistor, operated to provide a back electromotive force to render said silicon controlled rectifier inoperative in response to a voltage drop across that telephone line.

4. The combination as claimed in claim 3 wherein: said voltage reference means comprise a capacitor.

5. The combination as claimed in claim 1 wherein: said hold circuit further includes control triggering means connected to said silicon controlled rectifier and to said manually operated switching means, operated to establish a threshold for operation of said control means.

6. The combination as claimed in claim 5 wherein: said control triggering means comprise a resistor.

* * * * *